United States Patent [19]

Donig et al.

[11] Patent Number: 5,450,076
[45] Date of Patent: Sep. 12, 1995

[54] METHOD FOR REDUCING POWER LOSS IN DEVICES FOR CONTACTLESS DATA AND ENERGY TRANSMISSION, AND APPARATUS FOR PERFORMING THE METHOD

[75] Inventors: Günter Donig, Ottobrunn; Bruno Scheckel, Ebersberg; Karl-Reinhard Schoen, Munich, all of Germany

[73] Assignee: Siemens Aktiengesellschaft, Munich, Germany

[21] Appl. No.: 210,954

[22] Filed: Mar. 21, 1994

Related U.S. Application Data

[63] Continuation-in-part of Ser. No. 826,367, Jan. 27, 1992, abandoned.

[30] Foreign Application Priority Data

Jan. 25, 1991 [EP] European Pat. Off. ............ 91100994

[51] Int. Cl.⁶ ............................................. G08L 19/06
[52] U.S. Cl. ........................... 340/870.39; 340/870.31; 323/356
[58] Field of Search ....... 340/870.04, 870.28, 340/870.31, 870.39, 825.31; 323/283, 355, 356

[56] References Cited

U.S. PATENT DOCUMENTS

| 4,354,190 | 10/1982 | Reschovsky | 340/870.18 |
| 4,697,183 | 9/1987 | Jenning et al. | 340/870.25 |
| 4,924,171 | 5/1990 | Baba et al. | 323/347 |

FOREIGN PATENT DOCUMENTS

| 0330166 | 8/1989 | European Pat. Off. |
| 0336723 | 10/1989 | European Pat. Off. |
| 0466949 | 1/1992 | European Pat. Off. |
| 2037995 | 7/1980 | United Kingdom |

OTHER PUBLICATIONS

IBM Technical Disclosure Bulletin, vol. 19, No. 3 Aug. 1976 (Shulman et al.) New York, pp. 1005–1006 "Power level control in TDMA sattelite communication system".

Primary Examiner—Michael Horabik
Attorney, Agent, or Firm—Herbert L. Lerner; Laurence A. Greenberg

[57] ABSTRACT

Devices for contactless data and energy transfer include a stationary part having at least one coil for data and energy transfer, and a moveable part having at least one coil for data and energy transfer and having at least one memory unit. A method for reducing power loss in the devices includes transferring a test data word from the stationary part to the moveable part at a maximum energy, in an initializing mode, storing the transferred test data word in the memory unit of the moveable part, subsequently reading a test data word out of the memory unit of the moveable part and comparing the transferred test data word and the read-out test data word in the stationary part, reducing an energy supply if the transferred test data word and the read-out test data word match, and raising the energy supply by a defined amount and ending the initializing mode, if the transferred test data word and the read-out test data word do not match. An apparatus for reducing power loss the devices includes a stationary part having a device for contactless data transfer, a device for contactless energy transfer, and a process control connected to the device for contactless data transfer; and a moveable part having a device for receiving transferred energy and for receiving and transferring data, and at least one memory unit; the device for contactless energy transfer being controlled by the process control for adjusting an energy supply to the moveable part.

2 Claims, 2 Drawing Sheets

METHOD FOR REDUCING POWER LOSS IN DEVICES FOR CONTACTLESS DATA AND ENERGY TRANSMISSION, AND APPARATUS FOR PERFORMING THE METHOD

CROSS-REFERENCE TO RELATED APPLICATION

This application is a Continuation-In-Part of application Ser. No. 07/826,367, filed Jan. 27, 1992, now abandoned.

BACKGROUND OF THE INVENTION

1. Field of the Invention

The invention relates to a method and an apparatus for reducing power loss in devices for contactless data and energy transfer, having a stationary part and a moveable part, with at least one coil in each part for data and energy transfer, and at least one memory unit in the moveable part.

2. Description of the Related Art

Such an apparatus is disclosed in German Patent DE 34 47 560 C2, corresponding to U.S. Pat. No. 4,697,183, and in particular in FIGS. 1 and 2 thereof and the associated text describing those figures.

Those patents shows a device for contactless data and energy transfer, including a stationary part called a microstation and an oscillator for contactless power transfer with the aid of at least one pair of coils in a moveable part called a microunit. In the device described therein, two coils are provided in the stationary part, which form a total of two pairs of coils with two coils in the moveable part. Data transfer from the moveable part to the stationary part is effected by simultaneously varying the load on the two coils of the moveable part, which assures that there will be evidence of the load variation at one of the two coils of the stationary part, even if the pairs of coils were transposed. The oscillation of the oscillator in the stationary part is split into two separate oscillations (a reference oscillation and an information oscillation). Upon one oscillation (the information oscillation), a phase displacement relative to the other oscillation is imposed as a function of the data to be transferred, with the reference oscillation serving as a reference variable. The phase-displaced oscillation is supplied to the moveable part through one of the pairs of coils, and the other oscillation is supplied through the other pair of coils. The power is transferred through both pairs of coils, with the aid of both oscillations. In the moveable part, the transferred oscillations are supplied to a demodulator in the form of a phase comparator, which recovers the data from the phase displacement.

A respective rectifier is connected to the output side of each connection terminal of each coil in the moveable part. The output that furnishes the positive voltage in one of the rectifiers is interconnected with the output that furnishes the positive voltage in the other of the rectifiers, and the two output terminals of the two rectifiers, both of which furnish the negative voltage, are connected to one another as well. The common output of the two rectifier circuits is connected to a voltage regulator for furnishing the operating voltage of the moveable part. The voltage regulator may be a serial or a parallel regulator, for example.

Published European Application No. 0 466 949 A1, corresponding to U.S. application Ser. No. 07/590,033, filed Sep. 28, 1990 now abandoned, shows a device for contactless data and energy transfer and is distinguished from the known device described above primarily due to the fact that the power transfer is accomplished with the aid of only one pair of coils, and that the data transfer from the moveable part to the stationary part is effected by varying the load on the coil of the moveable part, which coil is not used for the power transfer.

That device for contactless data and energy transfer, as illustrated in FIG. 2 thereof, is provided with a first unit in the stationary part ST formed with an oscillator OSC and a first transistor T1. The first unit is provided for energy transfer by means of a first coil L1a. A second unit formed with an EXOR gate, a second transistor T2 and an evaluation circuit AS for data transfer from the stationary part to the moveable part by means of a second coil L1b. The second unit has a data input DT1 and a data output DR1 which can be connected to a non-illustrated process control unit, for instance a microprocessor.

The moveable part BT has two coils L2a and L2b which, together with the coils L1a and L1b of the stationary part, form two pairs of coils. The two coils L2a and L2b of the moveable part are each followed by a rectifier circuit GRa and GRb, respectively. The two rectifiers are each followed by a modulator Moda and Modb and by a voltage regulator SRA and SRB, respectively. Furthermore, the outputs of the coils L2a and L2b are connected with a demodulator Demod. The demodulator, the voltage regulators and the modulators can be connected to a non-illustrated logic circuit, for instance a microprocessor. The rectifiers, the modulators, the voltage regulators, the demodulator and the logic circuit together form a function unit.

In order to assure that the coils of the stationary part can be arbitrarily associated with the coils of the moveable part to form pairs of coils, and thus to assure that energy or data can be transferred through each of the two coils, even if not simultaneously, not only a rectifier circuit but also at least the final control element of a voltage regulator along with at least one switch, which can vary the load on the pair of coils associated with it as a function of its triggering and of the switch position effected by its triggering, are associated with each of the two coils of the moveable part. It is also possible for a voltage regulator and a variable load to be assigned to each coil, or for only one voltage regulator and one variable load, which can be selectively connected to the output side by reversing the coils of the moveable part, to be provided. In all such cases, a logical linkage must assure that the amplitude modulator required for data transfer from the moveable part to the stationary part always varies the load of the pair of coils which does not participate in the energy transfer, and which has a voltage regulator or voltage regulator final control element which is consequently not activated, or which does not have the voltage regulator connected to its output side.

If the coils of the moveable part and the coils of the stationary part can be coupled arbitrarily and a demodulator circuit as described above having a circuit for fixing the logic level of the signal is therefore provided, then in the same way in which it defines the logic level, the circuit unit can also recognize at which of the coils of the moveable part the information oscillation, which is variable in its phase position relative to the reference oscillation, is transferred. In such a device for contactless data and energy transfer, a logical linkage acts as a function of a demodulator circuit containing the information to define which coil of the moveable part is used for the data transfer from the moveable part to the stationary part, and which coil is intended for the energy transfer. It is also assured that the data transfer from the moveable part to the stationary part is performed with the aid of whichever coil of the moveable part is not being used for energy transfer at that moment. In order to assure a continuous energy supply to the moveable part, the coil that transfers the reference oscillation has a voltage regulator connected to its output side, or a voltage regulator connected to the output side of that coil is activated. For the data transfer from the moveable part to the stationary part, the load is varied as a function of the data to be transferred, at the coil of the moveable part that transfers the information oscillation.

One of the main problems of the above-described devices for contactless data and energy transfer is the manufacturing tolerances of the various components, and the resultant varying operating conditions in different systems. Such pronounced tolerances affect the data of the coil pairs (such as the coupling factor) above all, but they also affect the supply of energy to the primary side and the energy systems on the secondary side as well. Such tolerances have to be compensated for by supplying additional energy to the primary side. The excess energy is converted into heat on the secondary side in a so-called shunt controller. The usually poor heat conduction coefficients of the moveable parts (such as a chip card or key) cause impermissibly severe heating of those parts, which can destroy the component contained in the moveable part in the worst case.

It is accordingly an object of the invention to provide a method for reducing power loss in devices for contactless data and energy transfer and an apparatus for performing the method, which overcome the hereinafore-mentioned disadvantages of the heretofore-known methods and devices of this general type and which reduce the excess energy in the moveable part to a minimum.

SUMMARY OF THE INVENTION

With the foregoing and other objects in view there is provided, in accordance with the invention, method for reducing power loss in devices for contactless data and energy transfer, including a stationary part having at least one coil for data and energy transfer, and a moveable part having at least one coil for data and energy transfer and having at least one memory unit, which comprises transferring a test data word with the stationary part from the stationary part to the moveable part at a maximum energy, in an initializing mode, storing the transferred test data word in the memory unit of the moveable part, subsequently reading a test data word out of the memory unit of the moveable part with the stationary part and comparing the transferred test data word and the read-out test data word in the stationary part, reducing an energy supply if the transferred test data word and the read-out test data word match, and raising the energy supply by a defined amount and ending the initializing mode, if the transferred test data word and the read-out test data word do not match.

With the objects of the invention in view, there is also provided an apparatus for reducing power loss in devices for contactless data and energy transfer, comprising a stationary part having means for contactless data transfer, means for contactless energy transfer, and a process control connected to the means for contactless data transfer; and a moveable part having means for receiving transferred energy and for receiving and transferring data, and at least one memory unit connected to the means for receiving transferred energy and for receiving and transferring data; the means for contactless energy transfer being connected to and controlled by the process control for adjusting an energy supply to the moveable part.

In contactless data and energy transfer, the method of the invention makes it simple to adapt the energy transfer to the transfer conditions that pertain. This is made possible by an intelligent sampling process during an initializing operating mode. The stationary part continuously writes a test data word into the moveable part, reads it back out again, and compares it with the word that was written. Beginning with a maximum supply of energy, in which reliable reading and writing of data for any transfer condition that might arise is assured, the supply of energy is reduced incrementally after each writing and reading of a test data word. Due to the excess energy supply at the beginning, an adequate operating voltage is available in the moveable part, so that the written test data word and the one read out again will match. In the course of the procedure, if the written and read-out test data word should no longer match, then the supply voltage of the moveable part has dropped so far that reliable writing/reading operation is no longer assured. The energy most recently supplied is then raised by a safety margin, and the system then shifts to the normal operating mode.

Other features which are considered as characteristic for the invention are set forth in the appended claims.

Although the invention is illustrated and described herein as embodied in a method for reducing power loss in devices for contactless data and energy transfer and an apparatus for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
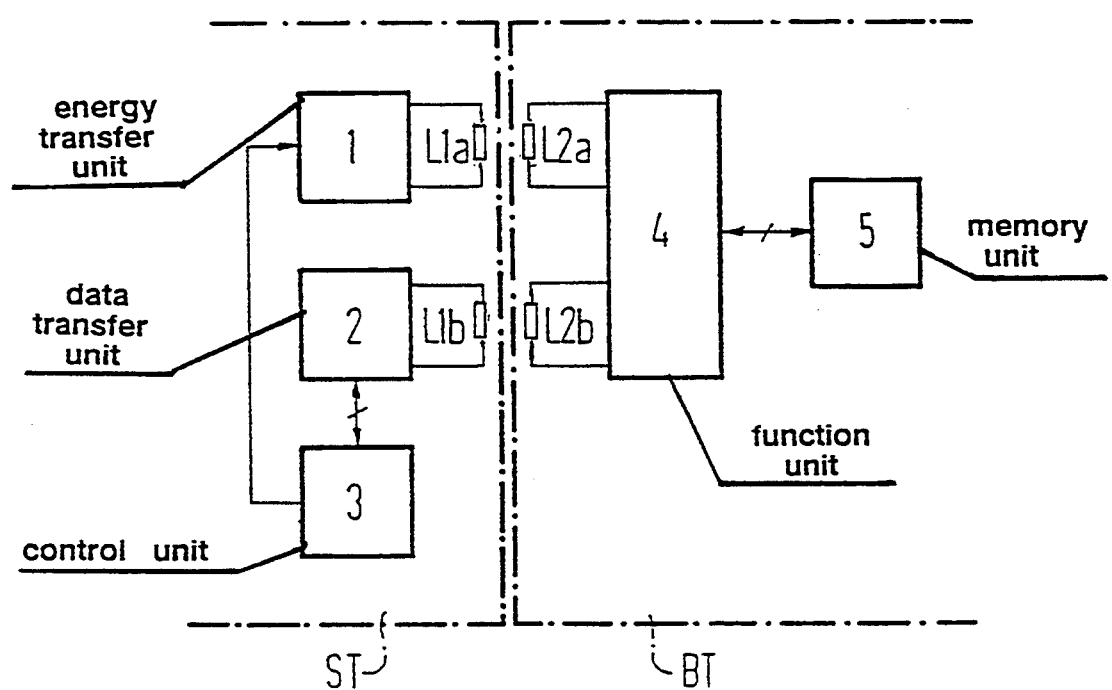
FIG. 1 is a schematic and block circuit diagram of a device for performing the method according to the invention.

Referring now to the FIG. 1 of the drawing in detail, there is seen a basic circuit diagram of an embodiment of an apparatus according to the invention for reducing the power loss in devices for contactless data and energy transfer, including a stationary part ST and a moveable part BT. The stationary part has first and second transfer coils, $L1a$ and $L1b$, and the moveable part likewise has first and second transfer coils, $L2a$ and $L2b$. The transfer coils of the stationary part are fixedly associated with the transfer coils of the moveable part, to form pairs of coils. In the drawing, the stationary part ST includes a first unit 1 for energy transfer, which is connected to the first coil L1a. The unit 1 is adjustable, so that the energy generation is variable. A second unit 2, which is connected to the second coil L1b, enables data transfer to the moveable part BT. This second unit 2 is connected to a process control unit 3. The process control unit 3 is also connected to the unit 1, over a control line.

For the sake of simplicity, only one function unit 4, which is connected to the transfer coils L2a and L2b, is shown. This function unit 4 includes units that are necessary for data transfer and energy generation. The first unit 1, the second unit 2, the process control unit 3 and the function unit 4 are known from the above-mentioned European patent publication No. 0 466 949 A1. A memory unit 5 which is connected to the function unit 4 is also shown. This memory unit may, for example, be a single register, or a memory cell inside a memory that may be present.

Figure 2:
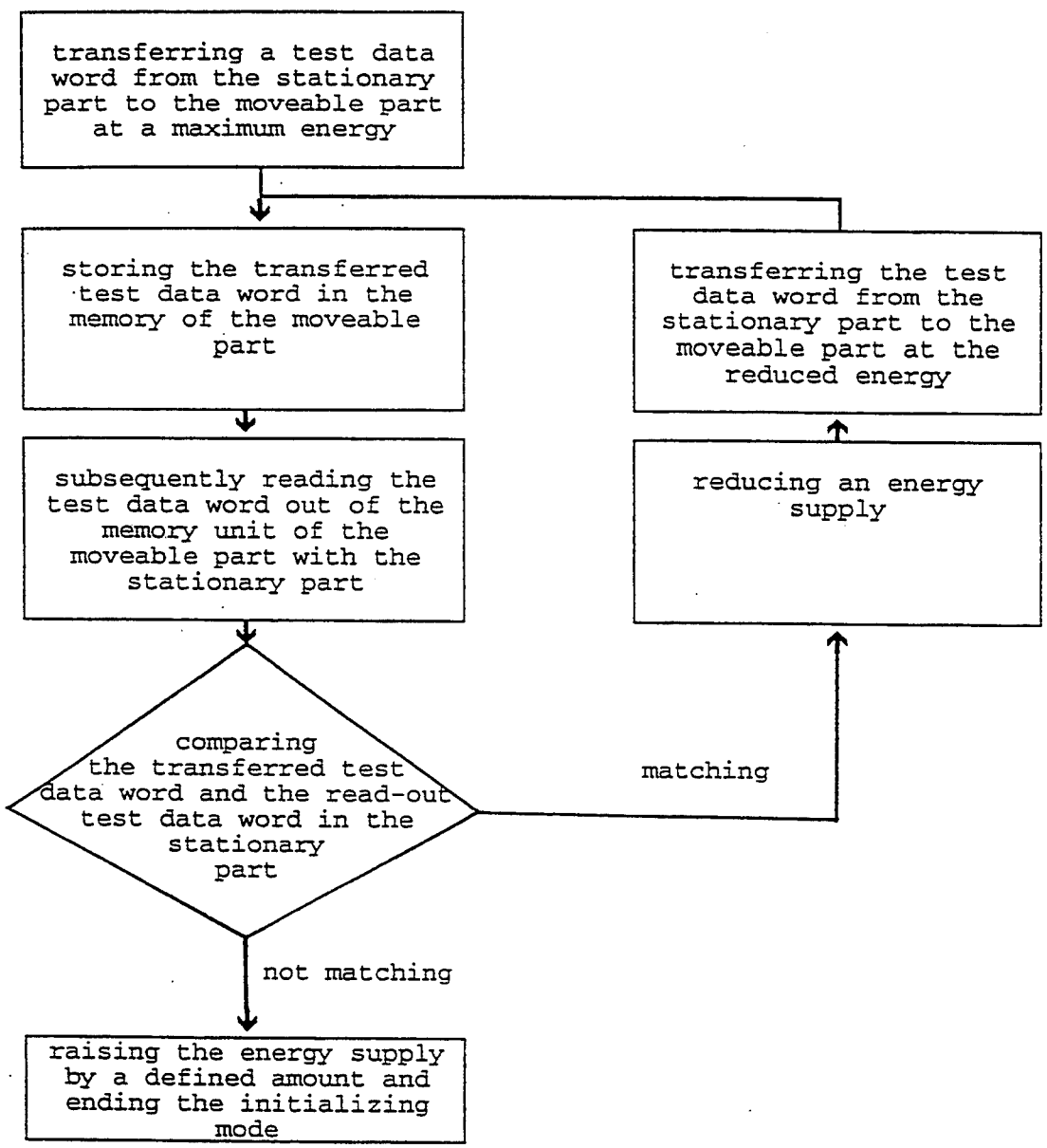
FIG. 2 is a flow chart detailing the method according to the invention.

Referring now to FIG. 2, in order to attain maximum efficiency in the energy transfer, the minimum amount of energy that is necessary is ascertained in an initializing mode. To this end, the process control unit 3 acts through the control line to initially set a maximum amount for the energy supply to the primary side. Then, through the unit 2, it sends the moveable part a test datum, which is stored in the memory unit 5 of the moveable part. Upon a reading command, the just-written test data word is then read out of the memory unit 5 and sent to the stationary part. The process control 3 then compares the read-out test data word with the word written beforehand, and if they match, it reduces the energy supply by a defined amount. This process is repeated until the written test data word and the test data word read out again afterward no longer match. The thus-ascertained energy supply value is less than the energy needed by the moveable part. Accordingly, the process control 3 acts through the control line to then raise the energy supply by a predetermined safety margin. This ends the initializing mode, and data can then be transferred bidirectionally from the moveable part to the stationary part and vice versa, in normal operation.

The reduction may, for instance, be performed incrementally at linear or logarithmic intervals. However, instead of a linear reduction, some other process, such as that of interval nesting, would also be conceivable. Beginning at a maximum input energy $P_{Max}$, stages of $\frac{1}{2}$ $P_{Max}$, $\frac{3}{4}$ $P_{Max}$, etc. would then follow.

The method according to the invention can be employed with any data exchange system in which both energy and data can be transferred, and in such systems it makes it possible to ascertain the minimum necessary energy requirement of the individual moveable part, in a simple fashion.

In this context, data exchange systems are systems in which a data carrier is connected to both the stationary part ST and the moveable part BT of the device for contactless data and energy transfer, and in which a data processing unit is connected to at least the stationary part ST.

The moveable part BT may be constructed in the form of a key. In access systems, the stationary part is then constructed in the form of a lock. In data exchange systems, the stationary part is constructed as a read and writing device, which is possibly coupled to a data processing unit. The moveable part of an apparatus for reducing the energy loss in devices for contactless data and energy transfer may also be constructed in the form of a chip card or key. In that case, the stationary part is part of a reading device or of a writing and reading device.

We claim:

1. A method for reducing power loss in devices for contactless data and energy transfer, including a stationary part having at least one coil for data and energy transfer, and a moveable part having at least one coil for data and energy transfer and having at least one memory unit, which comprises:

transferring a test data word from the stationary part to the moveable part at a maximum energy, in an initializing mode, storing the transferred test data word in the memory unit of the moveable part, subsequently reading a test data word out of the memory unit of the moveable part with the stationary part and comparing the transferred test data word and the read-out test data word in the stationary part, reducing an energy supply if the transferred test data word and the read-out test data word match, and raising the energy supply by a defined amount and ending the initializing mode, if the transferred test data word and the read-out test data word do not match.

2. A method for reducing power loss in devices for contactless data and energy transfer, including a stationary part having at least one coil for data and energy transfer, and a moveable part having at least one coil for data and energy transfer and having at least one memory unit, which comprises:

a) transferring a test data word from the stationary part to the moveable part at a maximum energy, in an initializing mode;

b) storing the transferred test data word in the memory unit of the moveable part;

c) subsequently reading a test data word out of the memory unit of the moveable part with the stationary part;

d) comparing the transferred test data word and the read-out test data word in the stationary part; and e) if the transferred test data word and the read-out test data word match, reducing an energy supply, transferring the test data word from the stationary part to the moveable part at the reduced energy, and repeating steps b)–d);

f) if the transferred test data word and the read-out test data word do not match, raising the energy supply by a defined amount and ending the initializing mode.

* * * * *